(12) United States Patent
Kuhley

(10) Patent No.: US 9,676,306 B2
(45) Date of Patent: Jun. 13, 2017

(54) ARMREST FOR A VEHICLE SEAT AND VEHICLE SEAT WITH THE ARMREST

(71) Applicant: GM GLOBAL TECHNOLOGY OPERATIONS LLC, Detroit, MI (US)

(72) Inventor: Christian Kuhley, Groß-Gerau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 14/816,609

(22) Filed: Aug. 3, 2015

(65) Prior Publication Data

US 2016/0031345 A1 Feb. 4, 2016

(30) Foreign Application Priority Data

Aug. 2, 2014 (DE) .................. 10 2014 011 587

(51) Int. Cl.
*A47C 7/54* (2006.01)
*B60N 2/46* (2006.01)
*B60N 2/68* (2006.01)

(52) U.S. Cl.
CPC ......... *B60N 2/4633* (2013.01); *B60N 2/4606* (2013.01); *B60N 2/68* (2013.01); *B60N 2/46* (2013.01); *B60N 2/466* (2013.01); *B60N 2/4666* (2013.01)

(58) Field of Classification Search
CPC ........ B60N 2/4606; B60N 2/46; B60N 2/466; B60N 2/4666
USPC ... 297/411.3, 411.2, 411.42, 411.46, 411.21, 297/411.36, 411.33, 411.32, 411.22, 297/411.24, 411.31
See application file for complete search history.

(56) References Cited

U.S. PATENT DOCUMENTS

| 5,076,641 | A | * | 12/1991 | Lindberg | .................. B60R 7/04 297/188.19 |
| 5,116,099 | A | * | 5/1992 | Kwasnik | ................ A47C 7/543 16/360 |
| 5,212,849 | A | * | 5/1993 | Aihara | .................. E05D 7/1061 16/232 |
| 5,465,557 | A | * | 11/1995 | Harte | ...................... B65B 31/02 16/289 |
| 5,716,467 | A | | 2/1998 | Marder et al. | |

(Continued)

FOREIGN PATENT DOCUMENTS

| CA | 2681791 A1 | 4/2010 |
| CN | 202571233 U | 12/2012 |

(Continued)

OTHER PUBLICATIONS

François Bergeron, Jean-François Audet; "Feasibility Study for the Development and Marketing of Magnesium Seats for Motor Coaches and Other Modes of Public Transit"; Jun. 2004.

(Continued)

*Primary Examiner* — Chi Q Nguyen
(74) *Attorney, Agent, or Firm* — Lorenz & Kopf LLP

(57) ABSTRACT

An armrest for a vehicle seat is disclosed. The armrest includes a monolithic frame as a support structure of the armrest and for fastening armrest upholstery thereto. The monolithic frame, which includes first and second longitudinal side rails and first and second transverse end rails, is constructed as a one-part, one-piece and/or one-material primary-formed component.

15 Claims, 2 Drawing Sheets

(56) References Cited

U.S. PATENT DOCUMENTS

| | | | | |
|---|---|---|---|---|
| 6,003,716 | A * | 12/1999 | Allison | B60R 7/04 220/326 |
| 9,457,695 | B2 * | 10/2016 | Mangold | B60N 2/4606 |
| 2005/0022384 | A1 | 2/2005 | Niedermann et al. | |
| 2008/0180916 | A1 | 7/2008 | Wickett | |
| 2008/0271936 | A1 | 11/2008 | Kuntze et al. | |
| 2009/0072565 | A1 * | 3/2009 | Mayne, Jr. | B60N 2/4686 296/24.34 |
| 2010/0148532 | A1 | 6/2010 | Jungert et al. | |
| 2010/0244414 | A1 | 9/2010 | Gilbert et al. | |
| 2011/0171027 | A1 * | 7/2011 | Perkinson | B64C 11/32 416/47 |
| 2012/0074741 | A1 * | 3/2012 | Andersson | B60N 2/46 297/188.14 |
| 2015/0115682 | A1 * | 4/2015 | Mangold | B60N 2/4626 297/411.21 |

FOREIGN PATENT DOCUMENTS

| | | |
|---|---|---|
| DE | 19546613 A1 | 7/1997 |
| DE | 102008032237 A1 | 3/2010 |
| DE | 102009014107 A1 | 9/2010 |
| DE | 102010018603 A1 | 11/2011 |
| EP | 1186469 A1 | 3/2002 |
| EP | 2017173 A2 | 1/2009 |

OTHER PUBLICATIONS

Raymond F. Decker, Stephen E. Lebeau; "Thixomolding"; Advanced Materials & Processes; Apr. 2008.

Joseph Ogando; "Thixomolding, what's that"; DesignNews; www.designnews.com; Apr. 17, 2000.

Ali Arslan Kaya, Deniz Tuncer, Alev Osma; "Forming an Automobile Rear Seat Frame Using Magnesium Alloy Extrudites" (abstract only); 2014 TMS Annual Meeting & Exhibition; Magnesium Technology 2014; www.programmaster.org.

"Think Thixomolding"; 2008; Thixomat; Ann Arbor, Michigan.

Katrina C. Arabe; "Thixomolding: Fabricating for the 21st Century"; Oct. 12, 2000; news.thomasnet.com.

"Improved Magnesium Molding Process (Thixomolding)"; Office of Industrial Technologies, Energy Efficiency and Renewable Energy—US Department of Energy; Jan. 2002.

German Patent Office, German Search Report for German Application No. 10 2014 011 587.9, dated Mar. 19, 2015.

Magnesium Injection—Thixomolding, http://www.fcmp.fr/pages_uk/savoir_faire/thixomoulage_application.htm, Jan. 30, 2014.

LTC Thixomolding, Magnesium Thixomolding®, http://www.ltc-gmbh.at/en-us/scopeofservices/magnesiumthixomoding%C2%AE.aspx, Jan. 30, 2014.

* cited by examiner

ARMREST FOR A VEHICLE SEAT AND VEHICLE SEAT WITH THE ARMREST

CROSS-REFERENCE TO RELATED APPLICATION

This application claims priority to German Patent Application No. 102014011587.9, filed Aug. 2, 2014, which is incorporated herein by reference in its entirety.

TECHNICAL FIELD

The present disclosure pertains to an armrest for a vehicle seat, and more particularly to an armrest frame having a unitary component defining a generally rectangular frame member.

BACKGROUND

Often, steel components are installed as support structures in vehicle interior fittings. The steel components are usually connected with one another by fastening techniques such as screwing, riveting and/or welding. For example, armrests for vehicle seats are often formed from several steel tubes, which are mounted and connected by corresponding fastening techniques.

Vehicle interior fittings are already known, the support structures of which are produced from a magnesium alloy. For example, the publication EP 1 186 469 A1 describes a backrest for a vehicle seat, wherein the backrest is produced from a magnesium alloy by thixoforming.

In light of this background, the present disclosure sets forth various desirable features and characteristics, which will become apparent from the subsequent summary and detailed description, and the appended claims, taken in conjunction with the accompanying drawings.

SUMMARY

The present disclosure provides a weight-reduced, functionally improved and/or easy to produce armrest for a vehicle seat. The armrest is able to be arranged laterally on the vehicle seat and/or pivotably relative thereto from a low position into a high position and vice versa. The armrest includes a basic frame, which is constructed as a support structure for the armrest. Alternatively or additionally, the basic frame is constructed for fastening armrest upholstery. For example, the basic frame is able to be foamed around with the armrest upholstery. The basic frame is constructed as a one-part, one-piece and/or one-material primary formed component. Through the construction of the basic frame as a one-part, one-piece and/or one-material primary formed component, a simple and cost-efficient manufacture of the basic frame can be provided in an advantageous manner. Moreover, joining processes, such as e.g. screwing, riveting and/or welding can be advantageously dispensed with. Thereby, assembly time and costs can be saved.

In a preferred embodiment of the present disclosure, the basic frame is primary formed and/or manufactured by a thixo-method, in particular by a so-called thixoforming, thixomolding and/or Semisolid Metal Casting (SSM). In particular, in the thixo-method the material from which the basic frame to be manufactured is heated to a temperature at which the material is transferred into a paste-like state. In this paste-like state, a portion of the material is in a state of melt and another portion in a solid state. In the paste-like state, the basic frame is produced by extrusion in an extruder injection molding machine.

Through the thixo-method, advantageously an increased dimensional stability and a better surface quality, e.g. a reduction of cavities can be guaranteed, than in conventional manufacturing methods used for the basic frame with individual steel components. In particular, an overall performance of the basic frame is distinctly improved compared with a basic frame which was produced e.g. in or by a conventional injection molding method.

Preferably, the basic frame is formed from a light metal alloy, in particular from a magnesium-zinc alloy. For example, the magnesium-zinc alloy is AZ91. The use of the magnesium-zinc alloy enables a distinct weight reduction compared with the use of other metal alloys, e.g. of steel, which advantageously can lead to the reduction of an energy consumption of the vehicle.

A preferred structural implementation of the present disclosure makes provision that the basic frame, in particular in a top view from above onto the basic frame, has a rectangular outer contour or a substantially rectangular outer contour. Preferably, the rectangular outer contour includes a first and a second longitudinal side and a first and second transverse side. Preferably, the longitudinal and transverse sides form a shared edging and/or a shared border.

Optionally, the basic frame includes a first and second transverse strut. Preferably the first and second transverse strut run in alignment and/or parallel to the first and second transverse side. In particular, the first and second transverse struts divide the rectangular outer contour into at least two, preferably three, rectangles. In particular, the first and second transverse sides connect the first and second longitudinal side with one another. It is advantageous that the rectangular outer contour of the basic frame is stabilized by the first and second transverse strut.

In a preferred embodiment of the present disclosure, the first transverse strut is connected at least partially and/or in sections with the first transverse side and/or is formed thereon. For example, the first transverse strut and the first transverse side are connected with one another and/or formed on one another in longitudinal extent partially and/or in sections. In particular, the first transverse side and the first transverse strut are arranged adjacent to one another and/or contact one another. It is possible that a connecting piece is arranged and/or formed between the first transverse strut and the first transverse side, with which connecting piece the first transverse strut is connected with the first transverse side.

Preferably, the basic frame has a first and a second pivot pin. For example, the first and second pivot pin is constructed for engagement into a pivot bearing of a vehicle interior fitting and for pivoting the armrest in the pivot bearing, in particular relative to the vehicle seat. For example, at least one of the pivot bearings is integrated into the vehicle seat and/or is arranged thereon.

Preferably, the first pivot pin is arranged and/or formed on the first longitudinal side and second pivot pin on the second longitudinal side of the rectangular outer contour. In particular, the first pivot pin projects transversely, in particular at right-angles, from the first longitudinal side, preferably toward outside the rectangle. Optionally, the second pivot pin projects transversely, in particular at right-angles, from the second longitudinal side, preferably toward outside the rectangle.

In a preferred structural implementation of the present disclosure, the first pivot pin is arranged and/or formed in extension of the first transverse side on the first longitudinal side and the second pivot pin in extension of the second transverse side on the second longitudinal side. Alternatively, the pivot pins can also be arranged at another location of the rectangular outer contour, e.g. on the first or second transverse side and project therefrom toward outside the rectangle.

It is also possible within the scope of the present disclosure that the basic frame includes further pins, e.g. detent pins for locking in a pivoted position and/or mounting pins for mounting on the vehicle seat. For example, the basic frame has a first and a second further pin. Preferably, the first further pin projects transversely, in particular at right-angles, from the first longitudinal side and the second further pin transversely, in particular at right-angles, from the second longitudinal side. For example, the first further pin is arranged and/or formed in extension of the first transverse strut on the first longitudinal side and the second further pin in extension of the second transverse strut on the second longitudinal side.

Alternatively, the first pins can also be arranged at another location of the rectangular outer contour, e.g. on the first or second transverse side and project therefrom toward outside the rectangle.

It is advantageous that the first and second pivot pins and optionally additionally the first and second further pins are primary formed components of the basic frame, in particular are formed by the thixo-method in one part, one piece and/or one material onto the rectangular contour. Thereby, the use and mounting of separate pivot pins and optionally additionally further pins can be eliminated. In particular, a unit number of components can be reduced and assembly costs can be saved.

In a preferred embodiment of the present disclosure, the second transverse side has at least one reinforcing rib for reinforcement. In particular, the reinforcing rib, in longitudinal extent of the second transverse side, is formed onto the latter. For example, the reinforcing rib projects in the direction of the first transverse side, in particular towards the interior of the rectangle, from the second transverse side. Thereby, advantageously a stabilizing of the second transverse side can be achieved and an overall stability of the basic frame can be increased.

In a further preferred embodiment of the present disclosure, the second transverse strut has at least one further reinforcing rib for reinforcement. In particular, the further reinforcing rib in longitudinal extent of the second transverse strut is formed onto the latter. For example, the further reinforcing rib in the low position of the armrest, mounted on the vehicle seat, projects downward, e.g. to a vehicle floor, from the second transverse strut. Thereby, in an advantageous manner, a stabilization of the second transverse strut can be achieved and an overall stability of the basic frame can be increased.

Alternatively or optionally, also at least one of the longitudinal sides, the first transverse side and/or the first transverse strut can have at least one reinforcing rib for reinforcement and/or stiffening.

A further subject of the present disclosure concerns a vehicle seat having the armrest according to the previous description. For example, the vehicle seat is constructed as a driver's seat, passenger's seat and/or as a seat of a rear bench seat of the vehicle having the armrest.

Preferably, the vehicle seat includes at least one pivot bearing for at least one of the two pivot pins of the basic frame, and the armrest is pivotably mounted with the first and/or second pivot pin in the pivot bearing(s) of the vehicle seat. In particular, the armrest is pivotable relative to the vehicle seat from the low position, in which it is arranged generally parallel to the vehicle floor, into the high position, in which it is arranged generally transversely, in particular perpendicularly, to the vehicle floor.

BRIEF DESCRIPTION OF THE DRAWINGS

The present disclosure will hereinafter be described in conjunction with the following drawing figures, wherein like numerals denote like elements.

Parts which correspond to one another or are identical are given the same reference numbers respectively in the figures.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
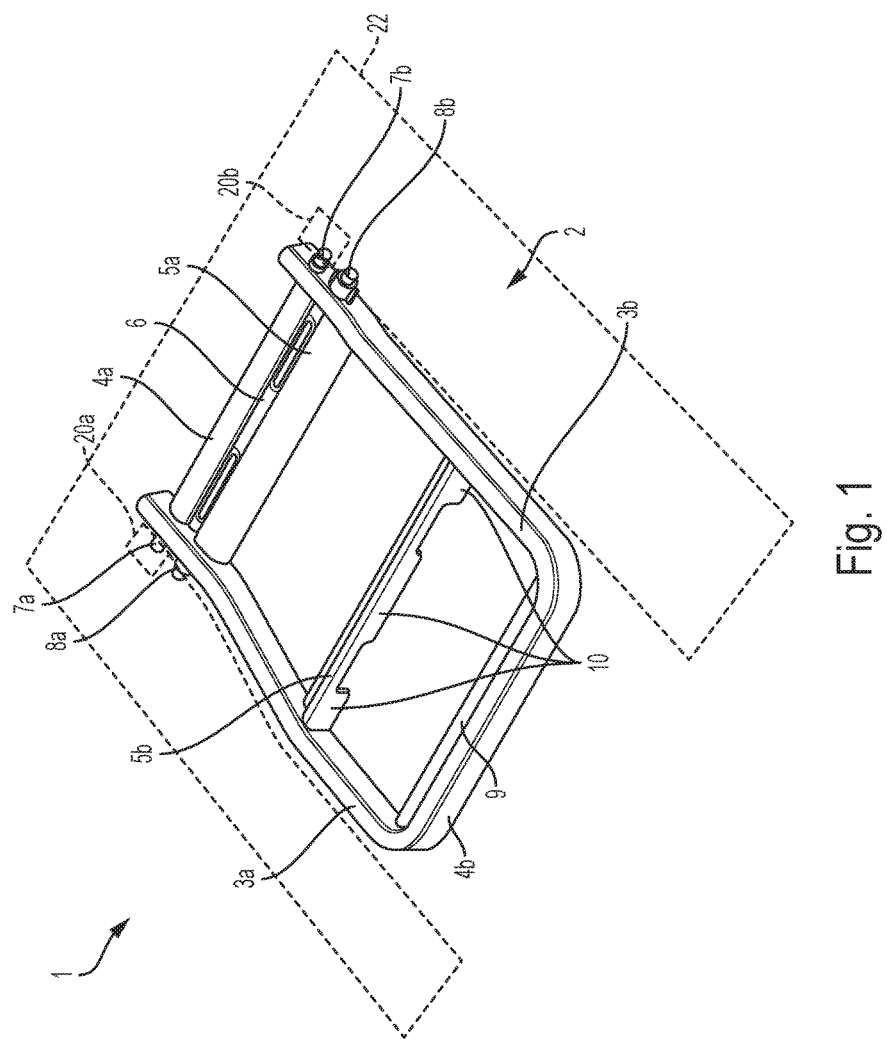
FIG. 1 is a perspective top view from above onto a basic frame of an armrest for a vehicle seat.

FIG. 1 shows a perspective top view from above onto a basic frame 1 of an armrest for a vehicle seat 22. The basic frame 1 forms a support structure for the armrest. It is constructed for fastening armrest upholstery thereto. For example, the basic frame 1 is able to be foamed around with the armrest upholstery. The armrest is able to be arranged on the vehicle seat 22 and is configured to pivot relative thereto from a low position into a high position and back. The vehicle seat 22 can be constructed as a driver's or passenger's seat or as a seat of a rear bench seat of a vehicle, in particular of an automobile or of a truck.

Figure 2:
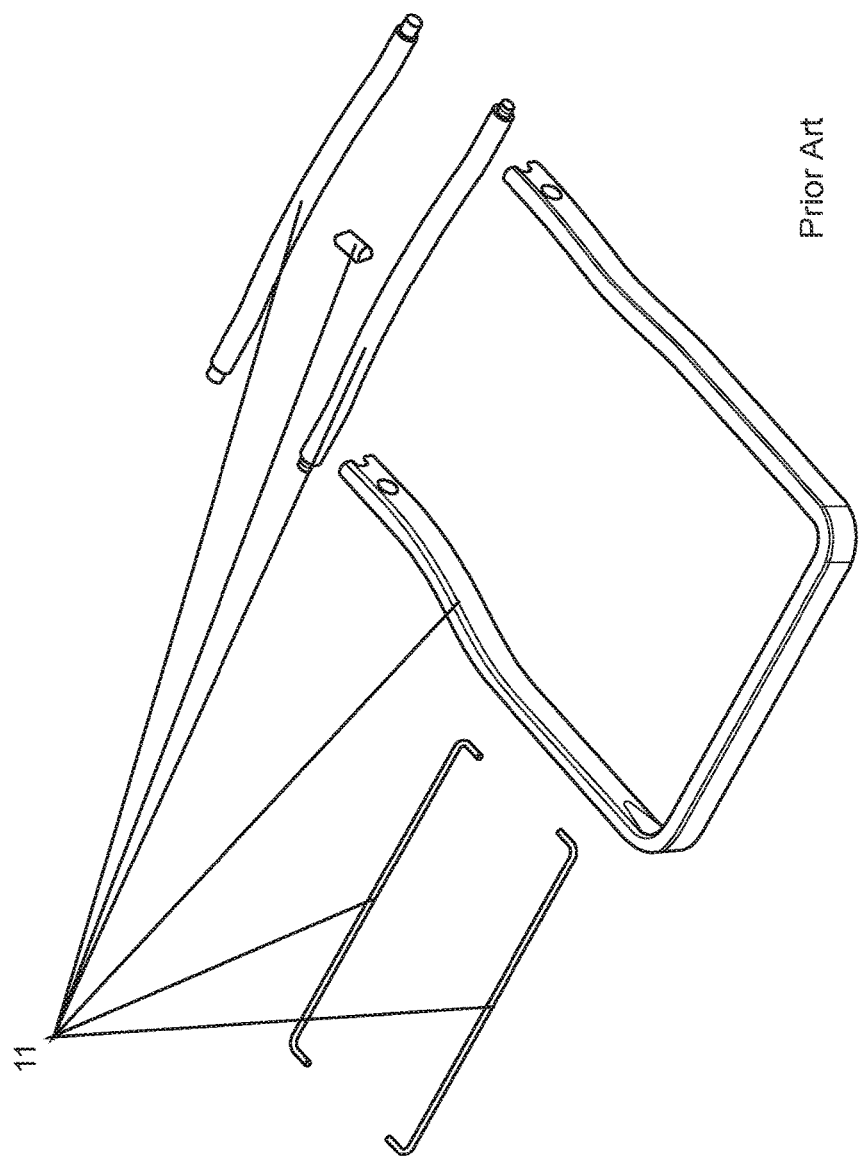
FIG. 2 shows a basic frame of a plurality of individual steel components from the prior art.

The basic frame 1 is constructed as a one-part, one-piece and/or one-material primary formed component or in other words a monolithic frame. It is produced from a light metal alloy, in particular from a magnesium-zinc alloy, e.g. AZ91, in a thixo-method, and preferably by thixomolding, thixoforming and/or Semisolid Metal Casting (SSM) method. The thixo-method combines the advantages of casting and forging with one another. The light metal alloy is heated up to a transition temperature between a solid and liquid state of the component. At this threshold, a thixotropic state of the light metal is reached. In the thixotropic state, the viscosity of the light metal is reduced under the effect of shearing forces, whereby with slight pressing it can be pressed very precisely in molds. In the thixo-method, the light metal alloy is conveyed, for example, with a worm in an injecting molding process into a casting mold. In the thixo-method, a heating channel can be inserted in the tool, as compared to conventional pressure or die casting in which the individual components of the basic frame, shown in FIG. 2, are produced. Thereby, in an advantageous manner, cycle time, material usage and flow paths can be reduced. In addition, a component quality, in particular the dimensional stability and surface characteristics of the basic frame can be improved.

The basic frame 1 has in top view from above a rectangular outer contour 2 or a substantially rectangular outer contour. The rectangular outer contour 2 is formed from a first and second longitudinal side 3a, 3b and from a first and second transverse side 4a, 4b.

The basic frame 1 includes a first and second transverse strut 5a, 5b. The first and second transverse strut 5a, 5b are arranged in alignment and/or parallel to the first and second transverse side 4a, 4b. They divide the rectangular outer contour 2 of the basic frame 2 and connect here the first and second longitudinal side 3a, 3b with one another. Thereby, the rectangular outer contour 2 of the basic frame 1 is stabilized and/or stiffened.

The first transverse strut 5a is arranged adjacent to the first transverse side 4a and is connected therewith. In particular, the first transverse strut 5a is formed on the first transverse side 4a via a connecting piece 6. The connecting piece 6 is formed in the primary forming process from the light metal alloy, in particular the magnesium-zinc alloy and is molded in the thixo-method between the first transverse side 4a and the first transverse strut 5a.

The basic frame 1 has a first and a second pivot pin 7a, 7b. The pivot pins 7a, 7b are constructed for engagement into a first and a second pivot bearing 20a, 20b, e.g. of the vehicle seat 22 and/or of a vehicle interior fitting. On engagement of the pivot pins 7a, 7b into the pivot bearings, the armrest is pivotable relative to the vehicle seat 22, e.g. from the low position into the high position and back.

The first pivot pin 7a is arranged and/or formed in extension of the first transverse side 4a on the first longitudinal side 3a and projects transversely, in particular at right-angles, therefrom toward outside the rectangle. The second pivot pin 7b in extension of the first transverse side 4a is arranged and/or formed on the second longitudinal side 3b of the rectangular outer contour 2 and projects transversely, in particular at right-angles, therefrom toward outside the rectangle.

The basic frame 1 has a first and a second further pin 8a, 8b. The first and second further pin 8a, 8b can be constructed e.g. as a detent pin for locking in a pivoted position of the armrest and/or as a mounting pin for mounting of the armrest on the vehicle seat and/or in the vehicle interior fitting. The first further pin 8a is arranged and/or funned on the first longitudinal side 3a spaced apart from the first pivot pin 7a. It projects transversely, in particular at right-angles, from the first longitudinal side 3a toward outside the rectangle. The second further pin 8b is arranged and/or formed spaced apart from the second pivot pin 7b on the second longitudinal side 3b. It projects transversely, in particular at right-angles, from the second longitudinal side 3b toward outside the rectangle.

The second transverse side 4b has a reinforcing rib 9. The reinforcing rib 9 is formed along the longitudinal extent of the second transverse side 4b onto the latter and projects from the second transverse side 4b transversely, in particular at right-angles into the rectangle. The reinforcing rib 9 is constructed for reinforcing and/or stiffening the second transverse side 4b.

The second transverse strut 5b has a plurality, e.g. three further reinforcing ribs 10. The further reinforcing ribs 10 are formed onto the second transverse strut 5b and project downwards therefrom. Here, they stiffen the second transverse strut 5b, so that the stability of the basic frame 1 is increased.

In FIG. 2, a convention armrest is shown to include a plurality of components 11 ((e.g. six steel members) for the formation of a basic frame 12. The steel components 11 may be produced in a pressure or die casting method. For the formation of the basic frame 12, the plurality of steel components 11 are to be connected with one another by screwing, riveting and/or welding. Compared with the monolithic frame 1 of FIG. 1 according to the present disclosure, this means an increased number of components, poorer surface characteristics, lower dimensional stability, a higher overall weight and/or an increased assembly expenditure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An armrest for a vehicle seat comprising:
a support structure including first and second longitudinal side rails and first and second transverse end rails forming a monolithic frame, the support structure having a first end opposite a second end, a first pivot pin formed on the first longitudinal side rail and a second pivot pin formed on the second longitudinal side rail at the first end, with the first transverse end rail at the first end and the second transverse end rail at the second end, and at least one first reinforcing rib is formed along a transverse strut, which is spaced apart from the second transverse end rail and the first transverse end rail,
wherein the at least one first reinforcing rib includes three reinforcing ribs that project from the transverse strut.

2. The armrest according to claim 1, wherein the monolithic frame is formed by a thixo-method.

3. The armrest according to claim 2, wherein the monolithic frame made with a light metal alloy.

4. The armrest according to claim 3, wherein the monolithic frame is formed from a magnesium-zinc alloy.

5. The armrest according to claim 1, wherein the monolithic frame in a top view from above has a rectangular outer contour with the first and second longitudinal side rails being parallel to one another and the first and second transverse end rails being parallel to one another and perpendicular to the first and second longitudinal side rails.

6. The armrest according to claim 1, wherein the monolithic frame further comprises a second transverse strut, which runs parallel to at least one of the first and second transverse end rails and connects the first and second longitudinal side rails with one another.

7. The armrest according to claim 6, wherein the second transverse strut is coupled to the first transverse end rail.

8. The armrest according to claim 6, wherein the first transverse strut runs parallel to at least one of the first and second transverse end rails and connects the first and second longitudinal side rails with one another.

9. The armrest according to claim 8, further comprising a second reinforcing rib formed on the second transverse end rail.

10. The armrest according to claim 1, wherein the first and second pivot pins are configured to engage into a first and a second pivot bearing and for pivoting the armrest in the pivot bearings.

11. The armrest according to claim 10, wherein the monolithic frame further comprises first and second further pins formed in spaced relation to the first and second pivot pins respectively.

12. The armrest according to claim 11, wherein the first further pin is formed on the first longitudinal rail and projects perpendicular therefrom, and the second further pin is formed on the second longitudinal side rail and projects perpendicular therefrom.

13. The armrest according to claim 1, wherein the first pivot pin extends from the first transverse side rail and projects perpendicular therefrom, and the second pivot pin extends from the second transverse side rail and projects perpendicularly therefrom.

14. A vehicle seat having the armrest according to claim 1 and further comprising first and second pivot pins configured to pivotally couple the armrest to the vehicle seat.

15. The vehicle seat according to claim 14, wherein the vehicle seat comprises first and second pivot bearing, wherein the armrest is mounted pivotably via the first and second pivot pins in the first and second pivot bearings respectively such that the armrest is pivotable therein relative to the vehicle seat.

* * * * *